UNITED STATES PATENT OFFICE.

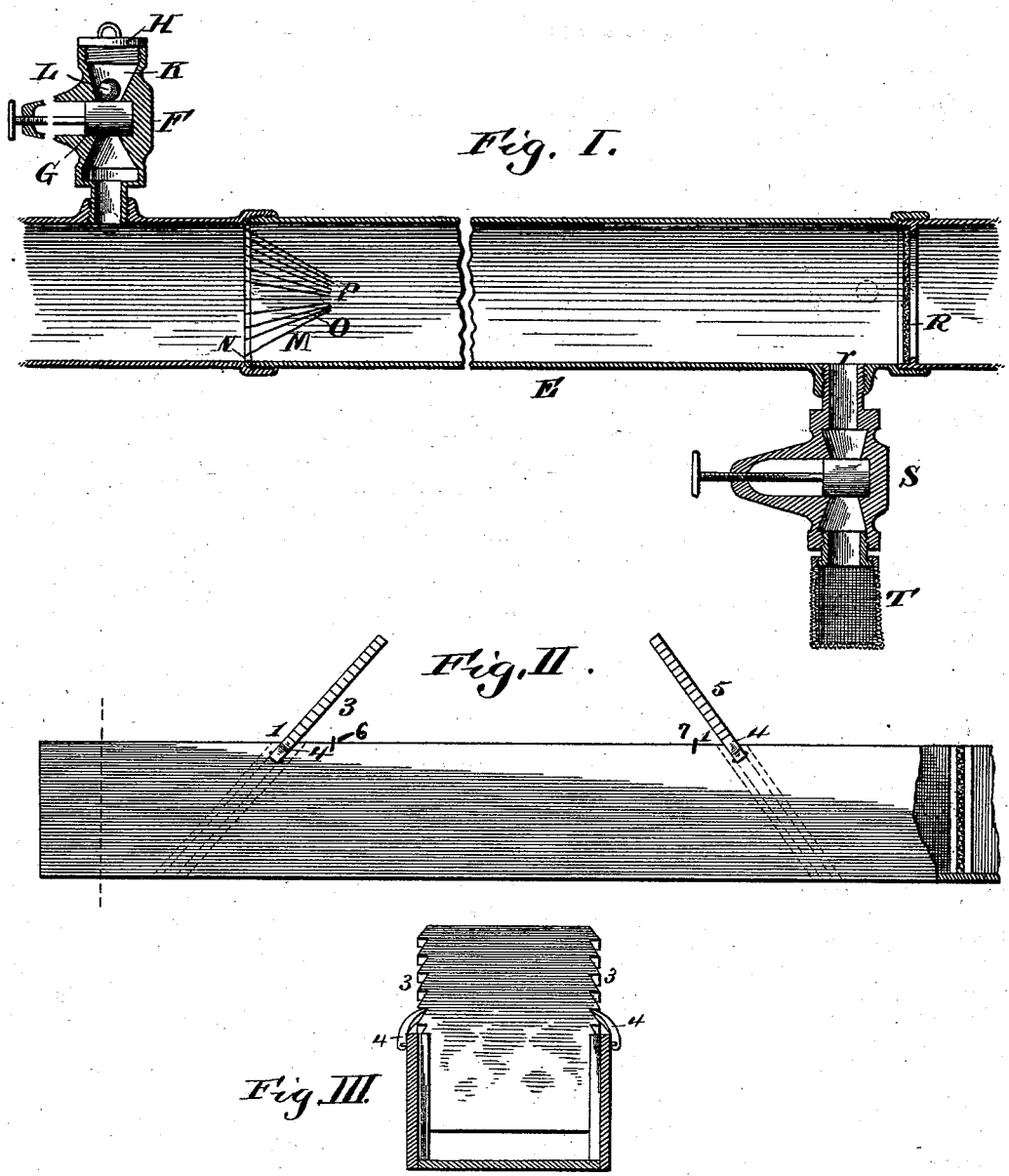

JOHN W. MENZIE, OF HURON, SOUTH DAKOTA.

SPEED-MEASURE.

SPECIFICATION forming part of Letters Patent No. 455,571, dated July 7, 1891.

Application filed May 26, 1890. Serial No. 353,157. (No model.)

*To all whom it may concern:*

Be it known that I, JOHN W. MENZIE, a citizen of the United States, and a resident of Huron, in the county of Beadle and State of South Dakota, have invented certain new and useful Improvements in Devices for Indicating the Velocity of Liquids in Conduits; and I do hereby declare the following to be a full, clear, and exact description of the invention, such as will enable others skilled in the art to which it appertains to make and use the same.

My invention relates to an improved system of irrigation, as will be hereinafter fully pointed out and claimed.

Referring to the accompanying drawings, forming a part of this specification, Figure I is a longitudinal sectional view of a conducting-pipe provided with means for measuring the quantity or determining the velocity of the water. Fig. II is a side elevation of a flume provided with my improved means for measuring the quantity and velocity of water therein. Fig. III is a detail view of the same for holding the wind-brakes in position.

Like letters and numerals of reference denote corresponding parts in all the figures.

My invention contemplates using the water procured from an artesian well, or a series of such wells, (or where accessible and more practicable from hydraulic pressure,) for the purpose of driving mills or other machinery, and for irrigating lands lying at a distance from such well without reference to the configuration of the intervening country, or the water may be carried into houses and used for household purposes.

To carry out my invention the water as it issues from the well is conveyed by means of a main or conduit, to which are attached branch pipes wherever desirable to convey the water, to the place or places where it is desired to use the same; and these conductors may be made of any preferred material and be run underground or elevated, as desired.

Where the country surrounding the well is generally level, the water may be conveyed through ditches or flumes, which may also be employed where the water is used for purposes of irrigation; but where the country over which the water is to be conveyed is of a hilly or mountainous character, I prefer to use pipes, as they can be more easily and cheaply laid in position and cost less for repairs. The pressure of the water derived from the well or wells is sufficient to carry it to quite a height the flow from different wells varying from one hundred to two hundred and forty pounds pressure for every surface inch.

At suitable intervals along the line of the main pipe are placed cut-offs, so that the water may be cut off from one or all of the branch pipes and turned on with greater force in another place or places. Each of the branch pipes is also provided at its point of connection with the main pipe as well as at various points intermediate of its length with cut-offs for a similar purpose.

In connection with my system of conveying water obtained from artesian wells to a distance, I have provided means whereby the velocity and quantity of water may be measured or determined.

When the water is conducted through pipes, the device shown in Fig. I is used, referring to which—

E designates the pipe through which the water is conveyed. To the top of the pipe E is connected a gate-valve F, the valve-plug G of which lies in a horizontal position. Above the valve G a hollow cover H is secured to the valve-casing in such a manner as to form a chamber K between the valve-plug and the cover, which is of sufficient size to contain the teller-ball L, situated normally between the valve-plug G and cover H when the valve is closed. On the inside of the pipe, and at any suitable distance from the gate-valve F, (the distance depending on the speed of the water,) is secured an indicating and guiding cone M, composed of steel wires or bars O, one end of which rods or bars are secured to a ring N, the inside diameter of which is slightly less than the diameter of the pipe E. This ring is adapted to be fitted between the ends of two sections of pipe to be securely held in position, and the outer ends of the steel wires O converge toward a common center, but are separated to provide a small opening P at the apex of the cone. This opening P is of such diameter that the teller-ball L can pass through, but not without coming in contact with the ends of the wires O, so that if the valve G is opened and the teller-ball L allowed to fall into the stream of water and be carried through the pipe the ball as it passes through the cone M will strike the ends of the wires O with sufficient force to make a noise sufficiently loud to be audible to a person who is listening for the sound. At some distance from the cone M within the pipe is arranged a grating R, which permits the water to freely pass through the grating, but the mesh of the grating is not large enough to allow the teller-ball to pass through.

In front of the grating R, and in the lower side of pipe E, is a chamber or depression $r$, which communicates with an outlet-valve S, similar in construction to the gate-valve F. To the lower side of this valve S is secured a basket or cage T for the purpose of catching and holding the teller-ball when the same drops by reason of the valve S being opened.

The operation of this device is as follows: The valve G is closed and the cover H is removed in order to place the teller-ball L within the chamber K, after which cover H is replaced. The valve G being opened, the teller-ball falls into the stream of water passing through the pipe. The teller-ball is composed of hard wood, white-oak being preferable, as its specific gravity approximates the specific gravity of water more closely than other hard woods, and the ball has a passage to receive a weight for the purpose of increasing its gravity should it become necessary, such passage being closed with a wooden plug. The tendency of the ball is to keep about the center of the current of water in the pipe. The current carries the teller-ball with the same velocity as it is traveling, and as the ball passes through the reduced end of the cone M it strikes the wires or bars O and makes a sound or noise sufficiently loud to be audible to a person listening for such indication, who takes note of the exact moment when the teller-ball passes through the cone. When the ball comes in contact with the grating R the watchman hearing the noise can by observing the time tell exactly how long it has taken the teller-ball to travel the distance between the cone M and the grating R, and, as the distance is known, the velocity of the water can be readily ascertained. The size of the pipe being known, the volume of water conveyed through the pipe can also be ascertained. After striking the grating R the teller-ball falls into the chamber or depression $r$ and falls into the basket or cage T when the valve S is opened.

When it is desired to measure the velocity of the water passing through a flume, I provide at some convenient place in the flume a mark 6 (see Fig. II) to denote the instant to begin to compute the time required for teller to pass between sixth and seventh time-marks, similar to that heretofore described for use in the pipe. At some distance above the time-mark 6 is secured in grooves which are cut in the inner surfaces of the sides of the flume a board 3, which is placed at an angle, as shown, and serves to diminish the force of the wind and prevent it from retarding or increasing the velocity of the teller. The lower end of this wind-brake extends nearly to the surface of the stream and at any desired height above the water, and is held in its inclined position by a pawl 4 on either side of the flume, the free end of which engages with one of a series of notches cut in either side of the wind-brake. At any desirable distance below the wind-brake I (the distance being greater where the velocity of the stream is high than it is where the stream is sluggish) I provide another brake 5 and time-mark 7 similar to the one just above described. The operation of this device is similar to the device before described for measuring the velocity and quantity of water passing through a pipe. A teller of wood is dropped in the stream some distance above the upper mouth of the flume, in order that it may acquire the full force of the current before reaching the first signal-mark 6. The observer notes the time that the teller-block passes the first and second signal-marks 6 and 7, and as the distance between the two time-marks is known and the time required by the teller to pass over that space, it is easy to ascertain the rate of the speed and volume of the water. The teller is arrested by the grating, the openings of which are not large enough to admit of its passage, although it offers little obstruction to the stream.

The number and relative position of the artesian wells or canals, as well as the conducting-pipes, canals, and appliances used in connection therewith, are dependent upon the geographical and geological conditions of the country in which the system is used, and I therefore reserve the right to make such modifications in the invention as these aforesaid conditions or either of them may demand or require.

Having thus fully described and explained my invention, what I claim as new, and desire to secure by Letters Patent, is—

1. The combination of a conduit adapted for the passage of liquids therein, a teller-ball adapted to float in the liquid within said conduit, and two indicators, substantially as described, situated a suitable distance apart within said conduit and adapted to indicate the velocity of a current of liquid passing through the conduit, as and for the purpose described.

2. The combination, with a conduit, of an inlet-valve, the cone M, the screen or grating R, the outlet-valve, and the teller-ball for determining the velocity of the current passing through said conduit, substantially as described.

3. The combination, with a conduit, of an inlet-valve, a ring secured between the ends of two adjoining sections of the conduit, a series of converging rods secured to said ring, a grating secured within the conduit, an outlet-valve, and a teller-ball, as and for the purpose described.

4. The combination, with a conduit, of an inlet-valve provided with the chamber K and the cone M, the grating R, a teller-ball, the outlet-valve, and the basket or cage T, as and for the purpose described.

5. The combination, with a pipe, of the signal-gratings situated a suitable distance from each other within the pipe, and a teller-ball adapted to be carried with the current of water through one signal-grating, for the purpose described, substantially as set forth.

6. The combination, with a pipe, of a conical signal-grating situated within the pipe and having an opening in its apex, another grating within the pipe at a suitable distance from the conical grating and constructed to arrest the motion of the teller-ball, a valve situated on one side of the conical grating, a teller-ball, and another valve situated near the other grating, but between the two gratings, substantially as described.

In testimony whereof I affix my signature in presence of two witnesses.

JOHN W. MENZIE.

Witnesses:
E. W. GOODNER,
FRANK WILSON.